(12) United States Patent
Chen

(10) Patent No.: US 10,241,374 B2
(45) Date of Patent: Mar. 26, 2019

(54) LIQUID CRYSTAL DISPLAY ASSEMBLY

(71) Applicant: SHENZHEN CHINA STAR OPTOELECTRONICS TECHNOLOGY CO., LTD., Shenzhen, Guangdong (CN)

(72) Inventor: Lixuan Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/577,166

(22) PCT Filed: Nov. 1, 2017

(86) PCT No.: PCT/CN2017/108859
§ 371 (c)(1),
(2) Date: Nov. 27, 2017

(65) Prior Publication Data
US 2019/0064565 A1 Feb. 28, 2019

(30) Foreign Application Priority Data
Aug. 25, 2017 (CN) .......................... 2017 1 0739170

(51) Int. Cl.
*G02F 1/1335* (2006.01)
*G02F 1/1368* (2006.01)
*G02F 1/1343* (2006.01)

(52) U.S. Cl.
CPC ...... *G02F 1/1368* (2013.01); *G02F 1/133514* (2013.01); *G02F 2001/134381* (2013.01)

(58) Field of Classification Search
CPC ............... G02F 2001/134372; G02F 1/134363
See application file for complete search history.

(56) References Cited

U.S. PATENT DOCUMENTS

2007/0064178 A1   3/2007   Murai
2012/0293741 A1   11/2012  Gu
2015/0279914 A1 * 10/2015  Qin ...................... G02F 1/1368
                                                              257/40

FOREIGN PATENT DOCUMENTS

CN   102169266 A   8/2011
CN   103926722 A   7/2014
CN   104865742 A   8/2015

* cited by examiner

*Primary Examiner* — Phu Vu
(74) *Attorney, Agent, or Firm* — Kirton McConkie; Evan R. Witt

(57) ABSTRACT

A liquid crystal display assembly is provided. The liquid crystal display assembly includes a first substrate, a second substrate, and a liquid crystal layer. First component units are disposed on a bottom surface of the first substrate. Second component units are disposed on a top surface of the second substrate. The first component units and the second component units have a one-to-one correspondence. A first thin-film transistor and a second thin-film transistor overlap with each other along a direction perpendicular to the first substrate and the second substrate.

17 Claims, 5 Drawing Sheets

LIQUID CRYSTAL DISPLAY ASSEMBLY

BACKGROUND

1. Field of the Disclosure

The present disclosure relates to liquid crystal display technologies, and more particularly, to a liquid crystal display assembly.

2. Description of Related Art

Liquid crystal display devices usually have a liquid crystal display assembly and a driving component. The liquid crystal display assembly usually includes an array substrate, a liquid crystal layer, and a color filter substrate that are overlapped with one another. The liquid crystal layer is disposed between the array substrate and the color filter substrate. However, current developing trends are directed to high resolution display devices. For a same area, more pixel units need to be disposed. Correspondingly, more thin-film transistors need to be disposed. This will increase non-transparent area, and thus decrease window area. Accordingly, light transmittance of the liquid crystal display assembly is reduced. Therefore, how to provide a liquid crystal display assembly, having a high light transmittance, is a problem to be solved in the industry.

SUMMARY

Embodiments of the present disclosure provide a liquid crystal display assembly having high light transmittance.

A liquid crystal display assembly includes a first substrate having a bottom surface, a plurality of first component units disposed on the bottom surface of the first substrate, each of the first component units including a first thin-film transistor, a first pixel part, and a first empty part; a second substrate having a top surface, the bottom surface of the first substrate opposite to the top surface of the second substrate, a plurality of second component units disposed on the top surface of the second substrate, each of the second component units including a second thin-film transistor, a second pixel part, and a second empty part, number of the first component units equal to number of the second component units, the first component units facing the second component units, a projection of one first thin-film transistor on the top surface of the second substrate covers one second thin-film transistor opposite to the one first thin-film transistor, a projection of one first pixel part on the top surface of the second substrate covers one second empty part opposite to the one first pixel part, a projection of one first empty part on the top surface of the second substrate covers one second pixel part opposite to the one first empty part, area of the first empty part greater than area of the first pixel part, area of the second empty part less than area of the second pixel part, red, green, and blue pixels periodically disposed on the plurality of the first pixel parts, red, green, and blue pixels periodically disposed on the plurality of the second pixel parts, red, green, and blue pixels staggered among different rows of the first pixel parts, red, green, and blue pixels staggered among different rows of the second pixel parts; and a liquid crystal layer disposed between the first substrate and the second substrate.

A liquid crystal display assembly includes a first substrate having a bottom surface, a plurality of first component units disposed on the bottom surface of the first substrate, each of the first component units including a first thin-film transistor, a first pixel part, and a first empty part; a second substrate having a top surface, the bottom surface of the first substrate opposite to the top surface of the second substrate, a plurality of second component units disposed on the top surface of the second substrate, each of the second component units including a second thin-film transistor, a second pixel part, and a second empty part, number of the first component units equal to number of the second component units, the first component units facing the second component units, a projection of one first thin-film transistor on the top surface of the second substrate covers one second thin-film transistor opposite to the one first thin-film transistor, a projection of one first pixel part on the top surface of the second substrate covers one second empty part opposite to the one first pixel part, a projection of one first empty part on the top surface of the second substrate covers one second pixel part opposite to the one first empty part, area of the first empty part greater than area of the first pixel part, area of the second empty part less than area of the second pixel part; and a liquid crystal layer disposed between the first substrate and the second substrate.

In the liquid crystal display assembly provided in an embodiment of the present disclosure, red, green, and blue pixels are periodically disposed on the plurality of the first pixel parts, and red, green, and blue pixels are periodically disposed on the plurality of the second pixel parts.

In the liquid crystal display assembly provided in an embodiment of the present disclosure, the liquid crystal display assembly further includes a plurality of third component units and a plurality of additional empty parts, each of the third component units including a third thin-film transistor and a third pixel part, number of the third component units equal to number of the additional empty parts, the third component units disposed on the bottom surface of the first substrate, the additional empty parts disposed on the top surface of the second substrate, the third component units facing the additional empty parts, the third component unit disposed between two adjacent first component units, the additional empty part disposed between two adjacent second component units, a projection of the third pixel part on the top surface of the second substrate covers a part of the additional empty part.

In the liquid crystal display assembly provided in an embodiment of the present disclosure, the liquid crystal display assembly further includes a plurality of third component units and a plurality of additional empty parts, each of the third component units including a third thin-film transistor and a third pixel part, number of the third component units equal to number of the additional empty parts, the third component units disposed on the top surface of the second substrate, the additional empty parts disposed on the bottom surface of the first substrate, the third component units facing the additional empty parts, the third component unit disposed between two adjacent second component units, the additional empty part disposed between two adjacent first component units, the additional empty part exposing the third pixel part.

In the liquid crystal display assembly provided in an embodiment of the present disclosure, all of the first pixel parts are red pixels, all of the second pixel parts are green pixels, and all of the third pixel parts are blue pixels.

In the liquid crystal display assembly provided in an embodiment of the present disclosure, all of the first pixel parts are red pixels, all of the second pixel parts are blue pixels, and all of the third pixel parts are green pixels.

In the liquid crystal display assembly provided in an embodiment of the present disclosure, all of the first pixel parts are green pixels, all of the second pixel parts are red pixels, and all of the third pixel parts are blue pixels.

In the liquid crystal display assembly provided in an embodiment of the present disclosure, all of the first pixel parts are green pixels, all of the second pixel parts are blue pixels, and all of the third pixel parts are red pixels.

In the liquid crystal display assembly provided in an embodiment of the present disclosure, all of the first pixel parts are blue pixels, all of the second pixel parts are green pixels, and all of the third pixel parts are red pixels.

In the liquid crystal display assembly provided in an embodiment of the present disclosure, all of the first pixel parts are blue pixels, all of the second pixel parts are red pixels, and all of the third pixel parts are green pixels. In the liquid crystal display assembly provided in the present disclosure, a plurality of first component units are disposed on the bottom surface of the first substrate, each of the first component units includes a first thin-film transistor, a first pixel part, and a first empty part; and a plurality of second component units are disposed on the top surface of the second substrate, each of the second component units includes a second thin-film transistor, a second pixel part, and a second empty part. The first component units and the second component units have a one-to-one correspondence. Meanwhile, a projection of the first thin-film transistor on the top surface of the second substrate covers the second thin-film transistor disposed opposite to the first thin-film transistor. In such a way, the first thin-film transistor and the second thin-film transistor overlap with each other along a direction perpendicular to the first substrate and the second substrate. Accordingly, non-transparent area decreases and light transparent area increases, thereby improving light transmittance.

DETAILED DESCRIPTION OF PREFERRED EMBODIMENTS

The embodiments of the present disclosure provide a liquid crystal display assembly 10.

Figure 1:
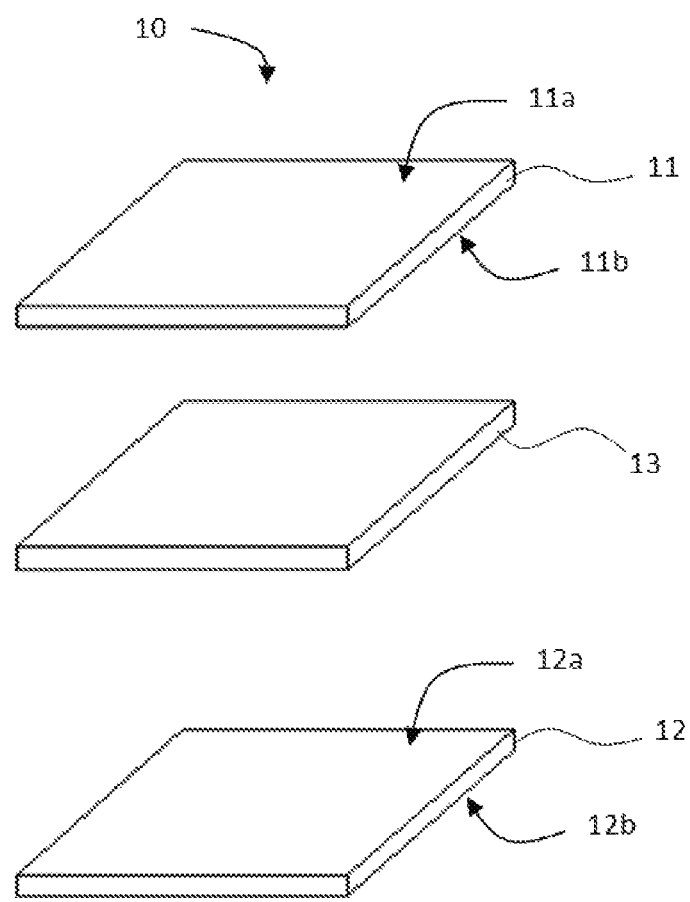
FIG. 1 is a schematic diagram showing a liquid crystal display assembly provided in embodiments of the present disclosure.

Referring to FIG. 1, the liquid crystal display assembly 10 includes a first substrate 11, a second substrate 12, and a liquid crystal layer 13. The first substrate 11 has a top surface 11a and a bottom surface 11b that are opposite to each other. The second substrate 12 has a top surface 12a and a bottom surface 12b that are opposite to each other. The bottom surface 11b of the first substrate 11 is opposite to the top surface 12a of the second substrate 12. The liquid crystal layer 13 is disposed between the first substrate 11 and the second substrate 12.

Figure 3:
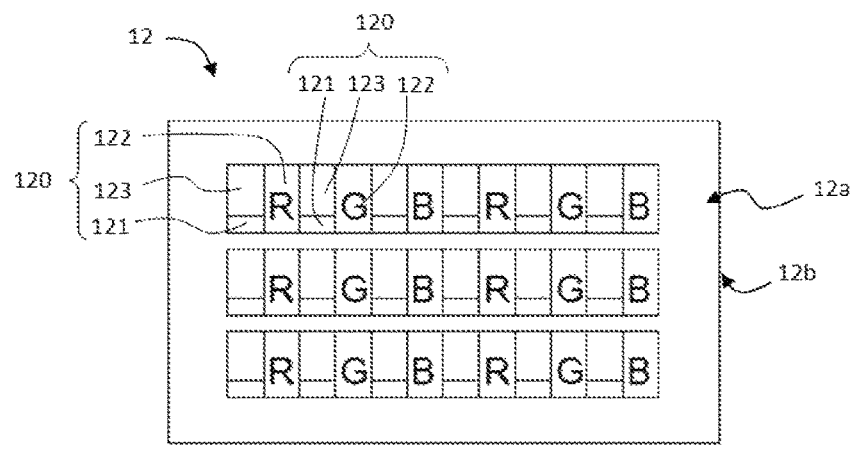
FIG. 3 is a top view of a second substrate of a liquid crystal display assembly provided in an embodiment of the present disclosure.
Figure 6:
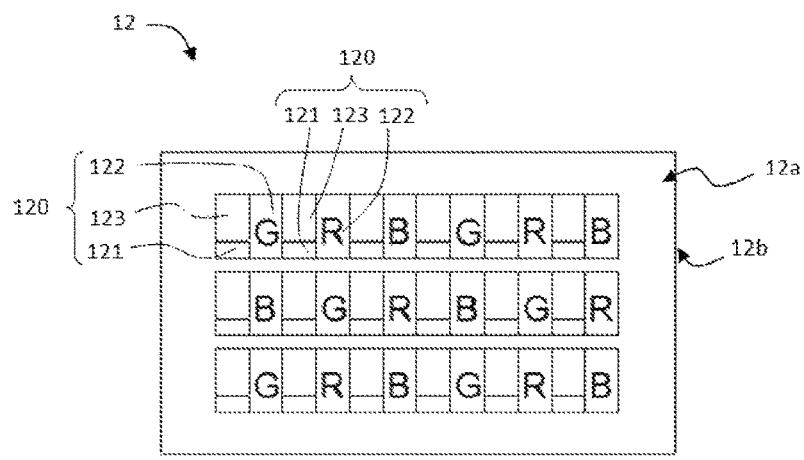
FIG. 6 is a top view of a second substrate of a liquid crystal display assembly provided in an embodiment of the present disclosure.

Referring to FIGS. 3 and 6, a plurality of second component units 120 are disposed on the top surface 12a of the second substrate 12. Each of the second component units 120 includes a second thin-film transistor 121, a second pixel part 122, and a second empty part 123. The area of the second empty part 123 is less than the area of the second pixel part 122.

The number of the first component units 110 is equal to the number of the second component units 120. The first component units 110 face the second component units 120.

Figure 2:
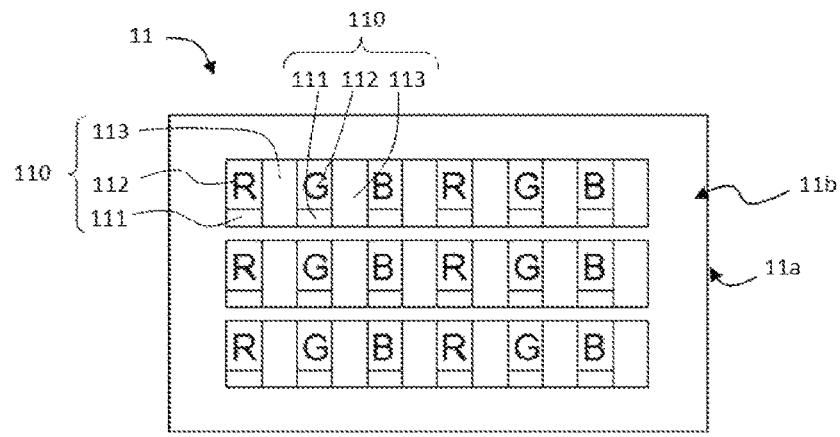
FIG. 2 is a top view of a first substrate of a liquid crystal display assembly provided in an embodiment of the present disclosure.
Figure 4:
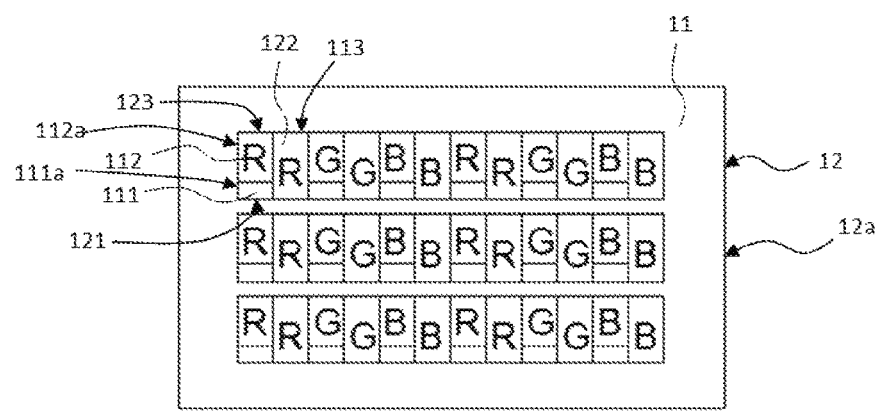
FIG. 4 is a top view of a liquid crystal display assembly including a first substrate shown in FIG. 2 and a second substrate shown in FIG. 3 in accordance with an embodiment of the present disclosure.
Figure 5:
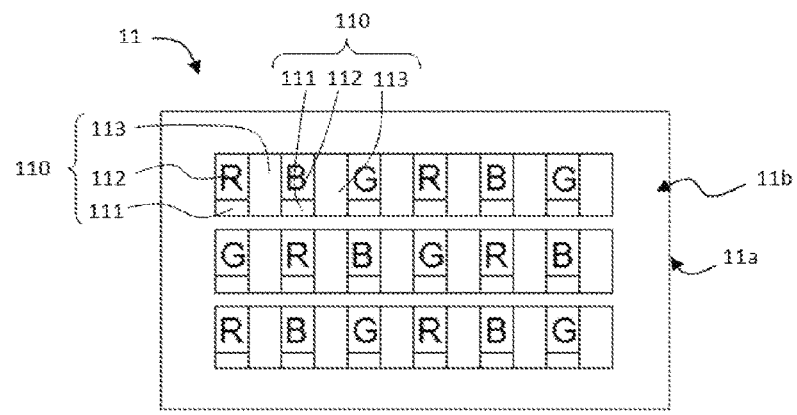
FIG. 5 is a top view of a first substrate of a liquid crystal display assembly provided in an embodiment of the present disclosure.
Figure 7:
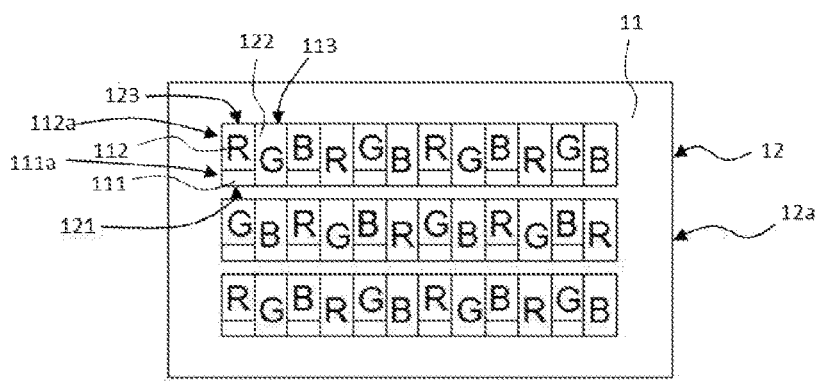
FIG. 7 is a top view of a liquid crystal display assembly including a first substrate shown in FIG. 5 and a second substrate shown in FIG. 6 in accordance with an embodiment of the present disclosure.

Referring to FIGS. 4 and 7, a projection 111a of one first thin-film transistor 111 on the top surface 12a of the second substrate 12 covers one second thin-film transistor 121 opposite to the one first thin-film transistor 111. A projection 112a of one first pixel part 112 on the top surface 12a of the second substrate 12 covers one second empty part 123 opposite to the one first pixel part 112. The first empty part 113 exposes the second pixel part 122 disposed opposite to the first empty part 113. In some embodiments, referring to FIGS. 2 and 5, red (R), green (G), and blue (B) pixels are periodically disposed on the plurality of the first pixel parts 110. Referring to FIG. 2, red (R), green (G), and blue (B) pixels are aligned among different rows of the first pixel parts 110. Referring to FIG. 5, red (R), green (G), and blue (B) pixels are staggered among different rows of the first pixel parts 110.

It is noted that as to "red (R), green (G), and blue (B) pixels are periodically disposed on the plurality of the first pixel parts 110", an order of "the red (R), green (G), and blue (B) pixels" can be RGB (as shown in FIG. 2) or RBG (as shown in FIG. 5).

In some embodiments, referring to FIGS. 3 and 6, red (R), green (G), and blue (B) pixels are periodically disposed on the plurality of the second pixel parts 120. Referring to FIG. 3, red (R), green (G), and blue (B) pixels are aligned among different rows of the second pixel parts 120. Referring to FIG. 6, red (R), green (G), and blue (B) pixels are staggered among different rows of the second pixel parts 120.

It is noted that as to "red (R), green (G), and blue (B) pixels are periodically disposed on the plurality of the second pixel parts 120", an order of "the red (R), green (G), and blue (B) pixels" can be RGB or RBG.

Referring to FIG. 4, in the liquid crystal display assembly 10 including the first substrate 11 shown in FIG. 2 and the second substrate 12 shown in FIG. 3, each row of pixels are periodically arranged with a pattern of RRGGBB. Referring to FIG. 7, in the liquid crystal display assembly 10 including the first substrate 11 shown in FIG. 5 and the second substrate 12 shown in FIG. 6, each row of pixels are periodically arranged with a pattern of RGB.

Figure 8:
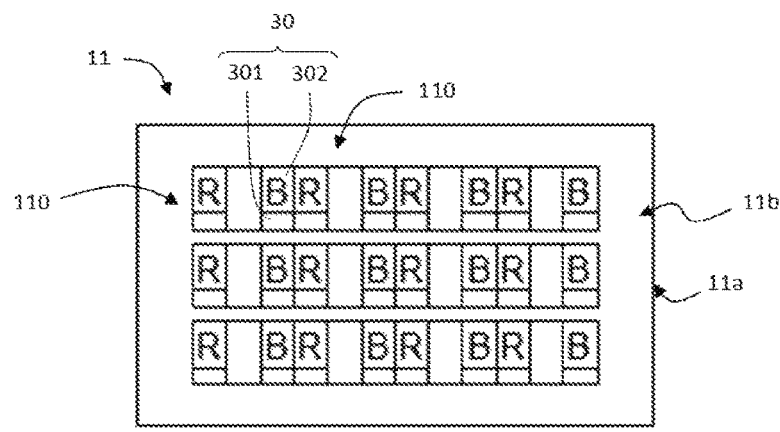
FIG. 8 is a top view of a first substrate of a liquid crystal display assembly provided in an embodiment of the present disclosure.
Figure 9:
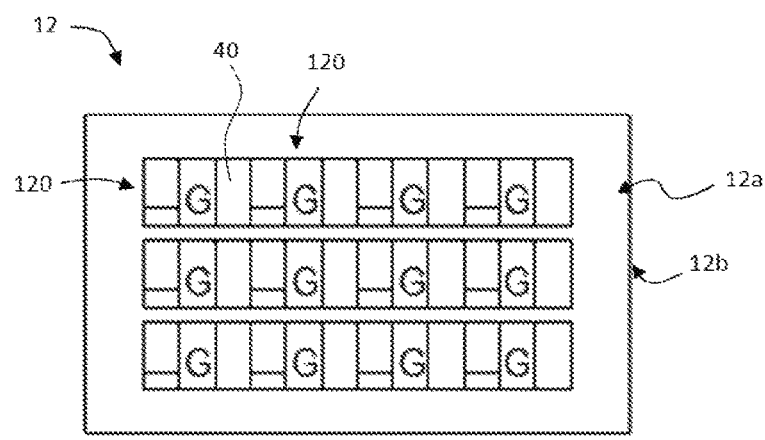
FIG. 9 is a top view of a second substrate of a liquid crystal display assembly provided in an embodiment of the present disclosure.
Figure 10:
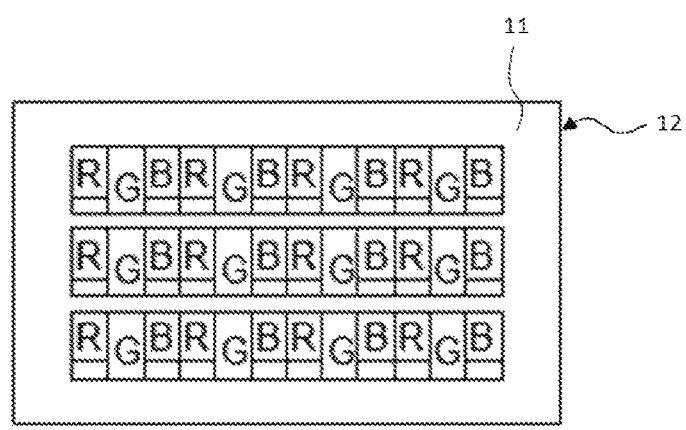
FIG. 10 is a top view of a liquid crystal display assembly including a first substrate shown in FIG. 8 and a second substrate shown in FIG. 9 in accordance with an embodiment of the present disclosure.

In some embodiments, referring to FIGS. 8 to 10, the liquid crystal display assembly 10 further includes a plurality of third component units 30 and a plurality of additional empty parts 40. The number of the third component units 30 is equal to the number of the additional empty parts 40. The third component units 30 face the additional empty parts 40. Each of the third component units 30 includes a third thin-film transistor 301 and a third pixel part 302.

Referring to FIGS. 8 and 9, the third component units 30 are disposed on the bottom surface 11b of the first substrate 11. The third component unit 30 is disposed between two adjacent first component units 110. The additional empty parts 40 are disposed on the top surface 12b of the second substrate 12. The additional empty part 40 is disposed between two adjacent second component units 120. Referring to FIG. 10, a projection 30a of the third component units 30 on the top surface 12a of the second substrate 12 covers the additional empty part 40.

Figure 11:
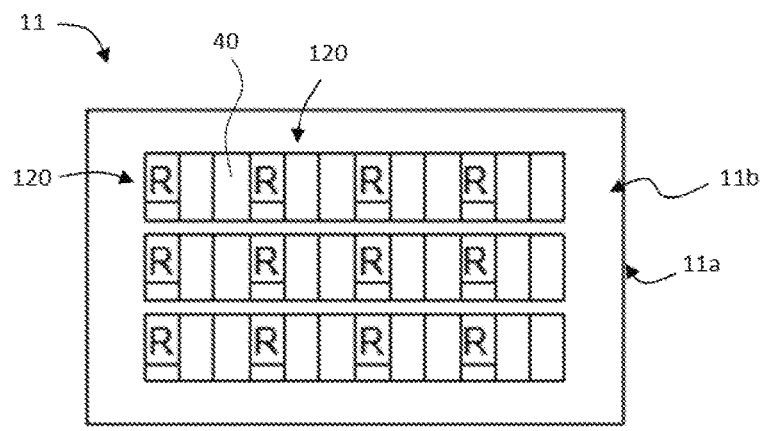
FIG. 11 is a top view of a first substrate of a liquid crystal display assembly provided in an embodiment of the present disclosure.
Figure 12:
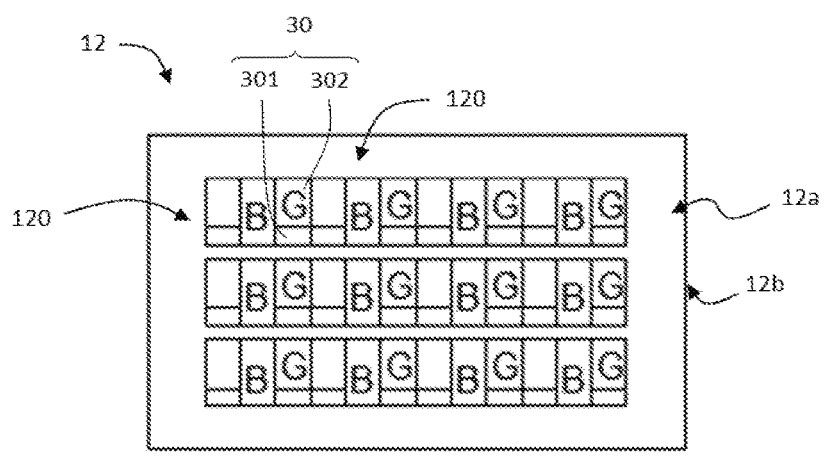
FIG. 12 is a top view of a second substrate of a liquid crystal display assembly provided in an embodiment of the present disclosure.
Figure 13:
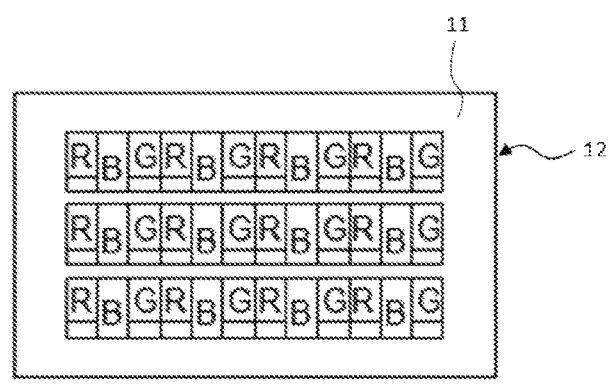
FIG. 13 is a top view of a liquid crystal display assembly including a first substrate shown in FIG. 11 and a second substrate shown in FIG. 12 in accordance with an embodiment of the present disclosure.

Referring to FIGS. 11 and 12, the third component units 30 are disposed on the top surface 12a of the second substrate 12. The third component unit 30 is disposed between two adjacent second component units 120. The additional empty parts 40 are disposed on the bottom surface 11b of the first substrate 11. The additional empty part 40 is disposed between two adjacent first component units 110. Referring to FIG. 13, the additional empty part 40 exposes the third component unit 30.

In one embodiment, all of the first pixel parts 112 are red (R) pixels, all of the second pixel parts 122 are green (G) pixels, and all of the third pixel parts 302 are blue (B) pixels.

In one embodiment, all of the first pixel parts 112 are red (R) pixels, all of the second pixel parts 122 are blue (B) pixels, and all of the third pixel parts 302 are green (G) pixels.

In one embodiment, all of the first pixel parts 112 are green (G) pixels, all of the second pixel parts 122 are red (R) pixels, and all of the third pixel parts 302 are blue (B) pixels.

In one embodiment, all of the first pixel parts 112 are green (G) pixels, all of the second pixel parts 122 are blue (B) pixels, and all of the third pixel parts 302 are red (R) pixels.

In one embodiment, all of the first pixel parts 112 are blue (B) pixels, all of the second pixel parts 122 are green (G) pixels, and all of the third pixel parts 302 are red (R) pixels.

In one embodiment, all of the first pixel parts 112 are blue (B) pixels, all of the second pixel parts 122 are red (R) pixels, and all of the third pixel parts 302 are green (G) pixels.

Referring to FIG. 10, in the liquid crystal display assembly 10 including the first substrate 11 shown in FIG. 8 and the second substrate 12 shown in FIG. 9, each row of pixels are periodically arranged with a pattern of RGB. Referring to FIG. 13, in the liquid crystal display assembly 10 including the first substrate 11 shown in FIG. 11 and the second substrate 12 shown in FIG. 12, each row of pixels are periodically arranged with a pattern of RBG.

In the liquid crystal display assembly 10 provided in the present disclosure, a plurality of first component units 110 are disposed on the bottom surface 11b of the first substrate 11, each of the first component units 110 includes a first thin-film transistor 111, a first pixel part 112, and a first empty part 113; and a plurality of second component units 120 are disposed on the top surface 12a of the second substrate 12, each of the second component units 120 includes a second thin-film transistor 121, a second pixel part 122, and a second empty part 123. The first component units 110 and the second component units 120 have a one-to-one correspondence. Meanwhile, a projection 111a of the first thin-film transistor 111 on the top surface 12a of the second substrate 12 covers the second thin-film transistor 121 disposed opposite to the first thin-film transistor 111. In such a way, the first thin-film transistor 111 and the second thin-film transistor 121 overlap with each other along a direction perpendicular to the first substrate 11 and the second substrate 12. Accordingly, non-transparent area decreases and light transparent area increases, thereby improving light transmittance.

The invention claimed is:

1. A liquid crystal display assembly comprising:
a first substrate having a bottom surface, a plurality of first component units disposed on the bottom surface of the first substrate, each of the first component units comprising a first thin-film transistor, a first pixel part, and a first empty part;
a second substrate having a top surface, the bottom surface of the first substrate opposite to the top surface of the second substrate, a plurality of second component units disposed on the top surface of the second substrate, each of the second component units comprising a second thin-film transistor, a second pixel part, and a second empty part, number of the first component units equal to number of the second component units, the first component units facing the second component units, a projection of one first thin-film transistor on the top surface of the second substrate covers one second thin-film transistor opposite to the one first thin-film transistor, a projection of one first pixel part on the top surface of the second substrate covers one second empty part opposite to the one first pixel part, a projection of one first empty part on the top surface of the second substrate covers one second pixel part opposite to the one first empty part, area of the first empty part greater than area of the first pixel part, area of the second empty part less than area of the second pixel part, red, green, and blue pixels periodically disposed on the plurality of the first pixel parts, red, green, and blue pixels periodically disposed on the plurality of the second pixel parts, red, green, and blue pixels staggered among different rows of the first pixel parts, red, green, and blue pixels staggered among different rows of the second pixel parts; and
a liquid crystal layer disposed between the first substrate and the second substrate.

2. A liquid crystal display assembly comprising:
a first substrate having a bottom surface, a plurality of first component units disposed on the bottom surface of the first substrate, each of the first component units comprising a first thin-film transistor, a first pixel part, and a first empty part;
a second substrate having a top surface, the bottom surface of the first substrate opposite to the top surface of the second substrate, a plurality of second component units disposed on the top surface of the second substrate, each of the second component units comprising a second thin-film transistor, a second pixel part, and a second empty part, number of the first component units equal to number of the second component units, the first component units facing the second component units, a projection of one first thin-film transistor on the top surface of the second substrate covers one second thin-film transistor opposite to the one first thin-film transistor, a projection of one first pixel part on the top surface of the second substrate covers one second empty part opposite to the one first pixel part, a projection of one first empty part on the top surface of the second substrate covers one second pixel part opposite to the one first empty part, area of the first empty part greater than area of the first pixel part, area of the second empty part less than area of the second pixel part; and a liquid crystal layer disposed between the first substrate and the second substrate.

3. The liquid crystal display assembly according to claim 2, wherein red, green, and blue pixels periodically disposed on the plurality of the first pixel parts, and red, green, and blue pixels periodically disposed on the plurality of the second pixel parts.

4. The liquid crystal display assembly according to claim 2, further comprising a plurality of third component units and a plurality of additional empty parts, each of the third component units comprising a third thin-film transistor and a third pixel part, number of the third component units equal to number of the additional empty parts, the third component units disposed on the bottom surface of the first substrate, the additional empty parts disposed on the top surface of the second substrate, the third component units facing the additional empty parts, the third component unit disposed between two adjacent first component units, the additional empty part disposed between two adjacent second component units, a projection of the third pixel part on the top surface of the second substrate covers a part of the additional empty part.

5. The liquid crystal display assembly according to claim 2, further comprising a plurality of third component units and a plurality of additional empty parts, each of the third component units comprising a third thin-film transistor and a third pixel part, number of the third component units equal to number of the additional empty parts, the third component units disposed on the top surface of the second substrate, the additional empty parts disposed on the bottom surface of the first substrate, the third component units facing the additional empty parts, the third component unit disposed between two adjacent second component units, the additional empty part disposed between two adjacent first component units, the additional empty part exposing the third pixel part.

6. The liquid crystal display assembly according to claim 4, wherein all of the first pixel parts are red pixels, all of the second pixel parts are green pixels, and all of the third pixel parts are blue pixels.

7. The liquid crystal display assembly according to claim 4, wherein all of the first pixel parts are red pixels, all of the second pixel parts are blue pixels, and all of the third pixel parts are green pixels.

8. The liquid crystal display assembly according to claim 4, wherein all of the first pixel parts are green pixels, all of the second pixel parts are red pixels, and all of the third pixel parts are blue pixels.

9. The liquid crystal display assembly according to claim 4, wherein all of the first pixel parts are green pixels, all of the second pixel parts are blue pixels, and all of the third pixel parts are red pixels.

10. The liquid crystal display assembly according to claim 4, wherein all of the first pixel parts are blue pixels, all of the second pixel parts are green pixels, and all of the third pixel parts are red pixels.

11. The liquid crystal display assembly according to claim 4, wherein all of the first pixel parts are blue pixels, all of the second pixel parts are red pixels, and all of the third pixel parts are green pixels.

12. The liquid crystal display assembly according to claim 5, wherein all of the first pixel parts are red pixels, all of the second pixel parts are green pixels, and all of the third pixel parts are blue pixels.

13. The liquid crystal display assembly according to claim 5, wherein all of the first pixel parts are red pixels, all of the second pixel parts are blue pixels, and all of the third pixel parts are green pixels.

14. The liquid crystal display assembly according to claim 5, wherein all of the first pixel parts are green pixels, all of the second pixel parts are red pixels, and all of the third pixel parts are blue pixels.

15. The liquid crystal display assembly according to claim 5, wherein all of the first pixel parts are green pixels, all of the second pixel parts are blue pixels, and all of the third pixel parts are red pixels.

16. The liquid crystal display assembly according to claim 5, wherein all of the first pixel parts are blue pixels, all of the second pixel parts are green pixels, and all of the third pixel parts are red pixels.

17. The liquid crystal display assembly according to claim 5, wherein all of the first pixel parts are blue pixels, all of the second pixel parts are red pixels, and all of the third pixel parts are green pixels.

* * * * *